(12) United States Patent
Suzuki (10) Patent No.: US 11,639,221 B2
(45) Date of Patent: May 2, 2023

(54) FLYING VEHICLE AND FLYING METHOD THEREFOR

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 367 days.

(21) Appl. No.: 16/956,951

(22) PCT Filed: Jan. 3, 2018

(86) PCT No.: PCT/JP2018/000001
§ 371 (c)(1),
(2) Date: Jun. 22, 2020

(87) PCT Pub. No.: WO2019/135264
PCT Pub. Date: Jul. 11, 2019

(65) Prior Publication Data
US 2020/0391863 A1  Dec. 17, 2020

(51) Int. Cl.
| | | |
|---|---|---|
| *B64C 29/02* | (2006.01) | |
| *B64U 10/25* | (2023.01) | |
| *B64C 5/02* | (2006.01) | |
| *B64C 39/02* | (2023.01) | |
| *B64U 30/20* | (2023.01) | |
| *B64U 50/13* | (2023.01) | |
| *B64U 70/80* | (2023.01) | |

(52) U.S. Cl.
CPC ............. *B64C 29/02* (2013.01); *B64C 5/02* (2013.01); *B64C 39/024* (2013.01); *B64U 10/25* (2023.01); *B64U 30/20* (2023.01); *B64U 50/13* (2023.01); *B64U 70/80* (2023.01)

(58) Field of Classification Search
CPC .......... B64C 29/02; B64C 39/08; B64U 10/20
See application file for complete search history.

(56) References Cited

U.S. PATENT DOCUMENTS

| | | | |
|---|---|---|---|
| 2011/0042508 A1 | 2/2011 | Bevirt | |
| 2016/0244159 A1 | 8/2016 | Bevirt | |
| 2018/0002011 A1* | 1/2018 | McCullough | ........... B64C 27/26 |

FOREIGN PATENT DOCUMENTS

| | | |
|---|---|---|
| CA | 2972528 C | 7/2019 |
| CN | 105966612 | 9/2016 |
| JP | 2007508998 A | 4/2007 |
| JP | 2010052713 A | 3/2010 |

(Continued)

OTHER PUBLICATIONS

Notice of Reasons for Refusal dated Jul. 9, 2020 for the related Japanese Patent Application No. 2020-107730.

(Continued)

*Primary Examiner* — Nicholas McFall (57) ABSTRACT

[Object] To provide a flying vehicle in which a working unit can be brought close to an appropriate distance from a work target. [Solution] The flying vehicle according to the present disclosure includes a flying part having a plurality of rotary blades for generating thrust, a leg part, an arm part connecting the flying part and the leg part, and a fixed wing part provided at substantially the center of the arm part. The flying body further includes a mounting part installed to be movable between the first position of the arm part and the second position located behind the first position.

20 Claims, 11 Drawing Sheets

(56) References Cited

FOREIGN PATENT DOCUMENTS

| JP | 2016517821 A | 6/2016 |
| JP | 2017015697 A | 1/2017 |
| JP | 2017159751 A | 9/2017 |
| JP | 2020015505 A | 1/2020 |

OTHER PUBLICATIONS

International Search Report for International Application No. PCT/JP2018/000001 dated Feb. 13, 2018.
Notice of Reasons for Refusal dated Nov. 10, 2022 for Japanese Patent Application No. 2021-196636.

* cited by examiner

FLYING VEHICLE AND FLYING METHOD THEREFOR

CROSS-REFERENCE TO RELATED APPLICATION

The present application is a National Phase Entry into the U.S. of PCT/JP2018/000001 filed Jan. 3, 2018, the disclosure of which is incorporated herein by reference in its entirety.

TECHNICAL FIELD

The present disclosure relates to a flying vehicle and flying method therefor.

BACKGROUND ART

In recent years, various services have been provided using a rotorcraft such as a drone or an unmanned aerial vehicle (UAV) (hereinafter simply referred to as "flying vehicle") used for various purposes. (For example, refer to Patent Document 1).

Further, among such flying vehicles, there is a flying vehicle disclosed in Patent Document 2 that includes a mounting part for mounting a load.

PRIOR ART LITERATURE

Patent Literature

Patent Document 1: Japanese Unexamined Patent Publication No. 2017-15697
Patent Document 2: Japanese Unexamined Patent Publication No. 2017-159751

DESCRIPTION OF THE INVENTION

Technical Problem

When carrying the above-mentioned load, in the technology described in Patent Document 2, not only is the structure complicated, but there is also no measure to cope with a lateral wind when descending, and there is a problem in safety.

Accordingly, one object of the present disclosure is to provide a flying vehicle having a more basic structure and safety measures.

Technical Solution

According to the present disclosure, it could provide
a flying vehicle, comprising:
a flying part having a plurality of rotary blades for generating thrust;
a leg part;
an arm part connecting the flying part and the leg part; and
a fixed wing part provided at substantially the center of the arm part,
wherein the flying body further includes a mounting part installed to be movable between a first position of the arm part and a second position located behind the first position.

Advantageous Effects

According to the present disclosure, a flying vehicle having a more basic structure and safety measures can be provided.

DETAILED DESCRIPTION OF THE INVENTION

The contents of the embodiment of the present disclosure will be listed and described. A flying vehicle and flying method therefor according to an embodiment of the present disclosure has the following configuration.

[Item 1]
A flying vehicle including a flying part having a plurality of rotary blades for generating thrust, a leg part, an arm part connecting the flying part and the leg part, and a fixed wing part provided at substantially the center of the arm part,
wherein the flying vehicle further includes a mounting part installed to be movable between a first position of the arm part and a second position located behind the first position.

[Item 2]
The flying vehicle as set forth in Item 1,
wherein the first position at least overlaps with the fixed wing part in a front-rear direction.

[Item 3]
The flying vehicle as set forth in Item 1 or Item 2,
wherein the fixed wing part is configured to have a pair of two fixed wings, and
the first position is located between the pair of fixed wings.

[Item 4]
The flying vehicle as set forth in any one of Items 1 to 3,
wherein the second position at least overlaps with the fixed wing part in a front-rear direction.

[Item 5]

The flying vehicle as set forth in any one of Items 1 to 4, further including a connecting part for connecting the flying part and the arm part so as to be displaceable independently of each other.

[Item 6]

The flying vehicle as set forth in Item 5, wherein the connecting part connecting the flying part and the arm part is a gimbal.

[Item 7]

A flying method of a flying vehicle as set forth in any one of Items 1 to 6, comprising:

a step of, in an initial state, setting the mounting part at the first position and mounting an object to be mounted, and of setting the arm part to stand vertically so that the flying part is at an upper end;

a step of driving the flying part to ascend the drive unit to be the front end in a traveling direction;

a step of, at a predetermined height, flying the flying part by displacing the flying part toward the horizontal direction by approximately 90 degrees so that the arm part extends in the horizontal direction;

a step of, above a destination, setting the arm part to stand vertically so that the leg part is at a lower end, and displacing the mounting part from the first position to the second position; and a step of descending so that the leg part is at the lower end.

Details of Embodiments

Hereinafter, a flying vehicle and a flying method of the flying vehicle according to embodiments of the present disclosure will be described with reference to the accompanying drawings.

Details of Embodiments According to the Disclosure

Figure 1:
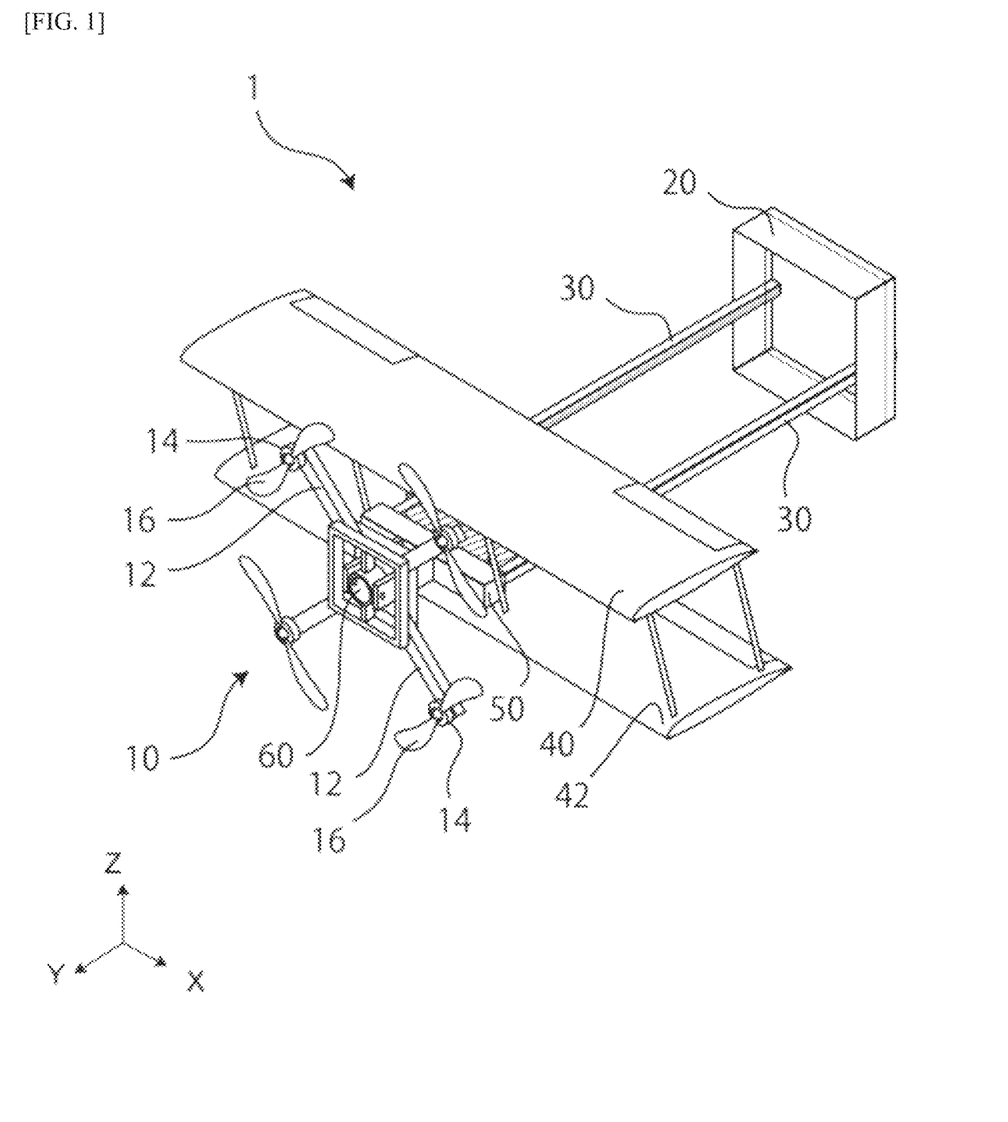
FIG. 1 is a perspective view of a flying vehicle according to the present disclosure.

As shown in FIG. 1, a flying vehicle 1 according to an embodiment of the present disclosure includes a flying part 10 including a plurality of rotary blades 16 for generating thrust, a leg part 20, an arm part 30 connecting the flying part 10 and the leg part 20, and a fixed wing part (upper fixed wing 40, lower fixed wing 42) provided substantially at the center of the arm part 30.

It should also be noted that the illustrated flying vehicle 1 is depicted in a simplified manner in order to facilitate the description of the structure of the present disclosure. For example, the detailed configurations of the control unit and the like are not illustrated.

Further, the axis in the figure represents an absolute axis. The Z axis (Z direction) is a vertical direction, and both the X axis and the Y axis are horizontal directions.

<Details of Structure>

The flying part 10 according to the present embodiment includes a propeller 16, a motor 14 that rotates the propeller 16, and a motor arm 12 that supports the motor 14. The flying part 10 according to the present embodiment has four sets of a propeller 16, a motor 14, and a motor arm 12 in a cross shape.

The propeller 16 rotates by receiving output from the motor 14. As the propeller 16 rotates, a propulsive force is generated for taking off the flying vehicle 1 from a departure point, horizontally moving it, and landing it at a destination (details of the flight will be described later). Note that the propeller can rotate rightward, stop, and rotate leftward.

The propeller 16 may have any number of blades (rotors) (e.g., 1, 2, 3, 4, or more blades). The shape of the blade can be any shape such as a flat shape, a bent shape, a twisted shape, a tapered shape, or a combination thereof.

In addition, the shape of the blade can be transformed (for example, retractable, foldable, bendable, etc.). The blades can be symmetrical (having the same upper and lower surfaces) or asymmetric (having differently shaped upper and lower surfaces).

The blade can be formed to have a geometrical form preferable for generating dynamic aerodynamic forces (e.g., lift, thrust) when an airfoil, wing or blade is moved through the air. The geometrical form of the blade can be selected as appropriate to optimize the dynamic air characteristics of the blade, such as increasing lift and thrust and reducing drag.

The motor 14 causes the rotation of the propeller 16. For example, a drive unit may include an electric motor or an engine. The blade can be driven by the motor and rotate around a rotation axis of the motor (e.g., the long axis of the motor) in a clockwise and/or counterclockwise direction.

All the blades can rotate in the same direction, or it is also possible to rotate independently. Some of the blades rotate in one direction and the other blades rotate in the other direction. All of the blades can be rotated at the same rotational speed, or can also be rotated at different rotational speeds. The number of rotations can be determined automatically or manually based on the dimensions (for example, size, weight) or the control state (speed, moving direction, etc.) of the moving body.

The motor arm 12 is a member that supports the corresponding motor 14 and propeller 16. The motor arm 12 may include a color displaying body such as an LED to indicate the flight state, flight direction, etc. of the rotorcraft. The motor arm 12 according to the present embodiment can be formed of a material appropriately selected from carbon, stainless steel, aluminum, magnesium, etc., or alloys or combinations thereof.

In the present embodiment, the flying part 10 (see FIG. 1) and the arm part 30 are connected via a gimbal 60. Thereby, the flying part 10 and the arm part 30 can be displaced independently.

That is, since the orientation of the flying part 10 can be controlled independently of the orientation of the arm part 30, the gimbal 60 that is not affected by the orientation of the arm part 30 and the orientation of the flying part 30 is a gimbal 60 that is rotatable around at least two axes (X axis and Z axis).

The arm part 30 has two linear shapes, each having one end connected to the flying part 10 and the other end connected to the leg part 20.

Figure 2A:
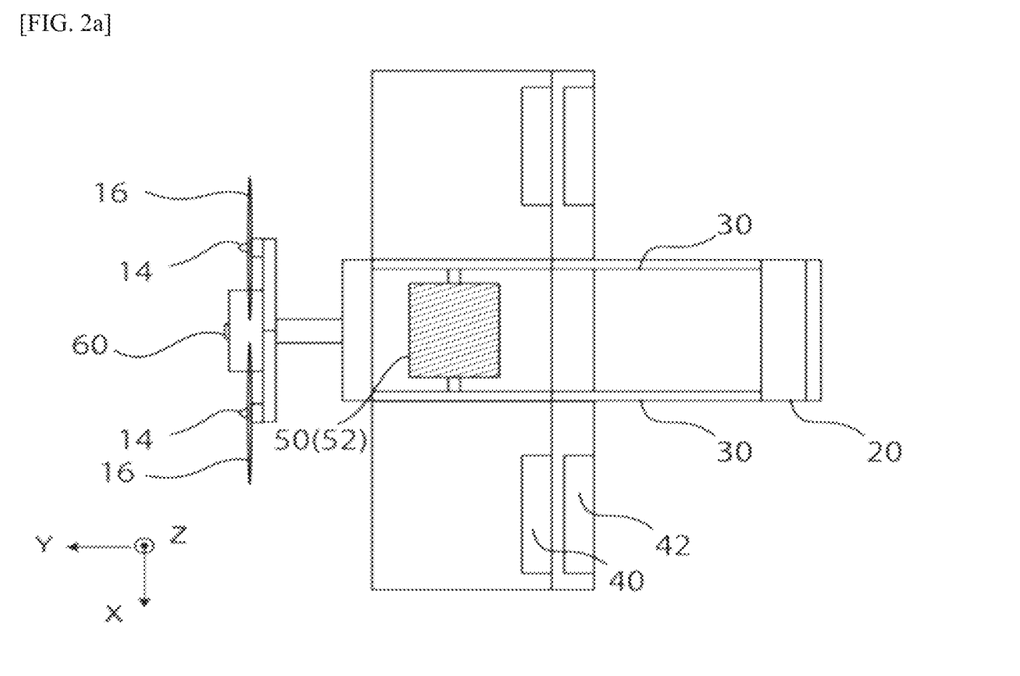
FIGS. 2a and 2b are top views of the flying vehicle of FIG. 1.
Figure 2B:
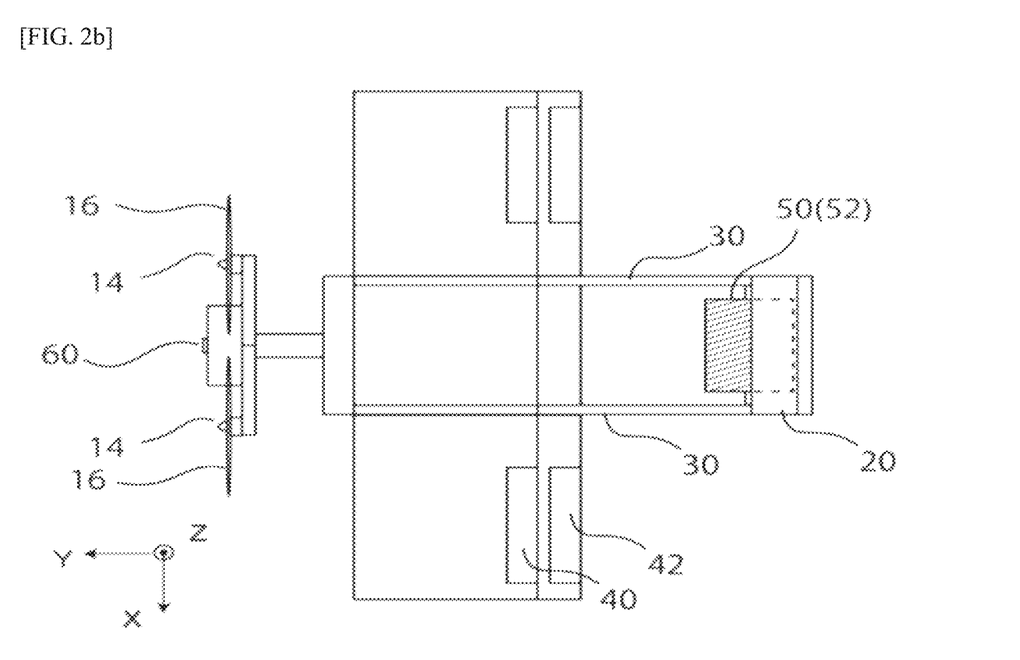

As shown in FIGS. 2a and 2b, the mounting part 50 according to the present embodiment is provided on the arm part 30. The mounting part 50 is configured to be movable along the arm part 30 from the first position shown in FIGS. 2a and 3a toward the second position shown in FIGS. 2b and 3b.

The mounting part 50 according to the present embodiment is displaceable between the first position and the second position by the guiding of the arm part 30 formed in a rail shape. Note that the movement method may be another method, and any method may be used if the method allows fixing to the first position and the second position and the movement control between these positions.

Figure 3A:
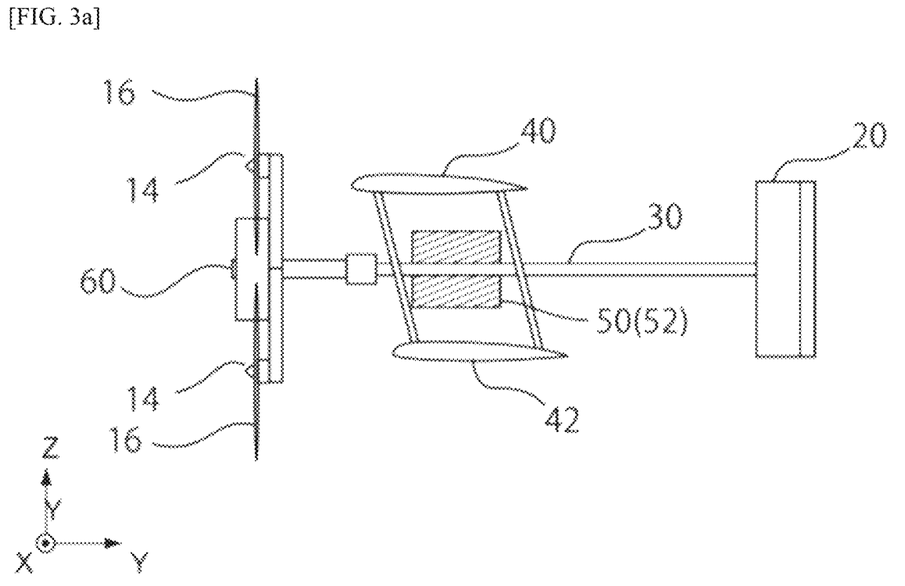
FIGS. 3a and 3b are side views of the flying vehicle of FIG. 1.
Figure 3B:
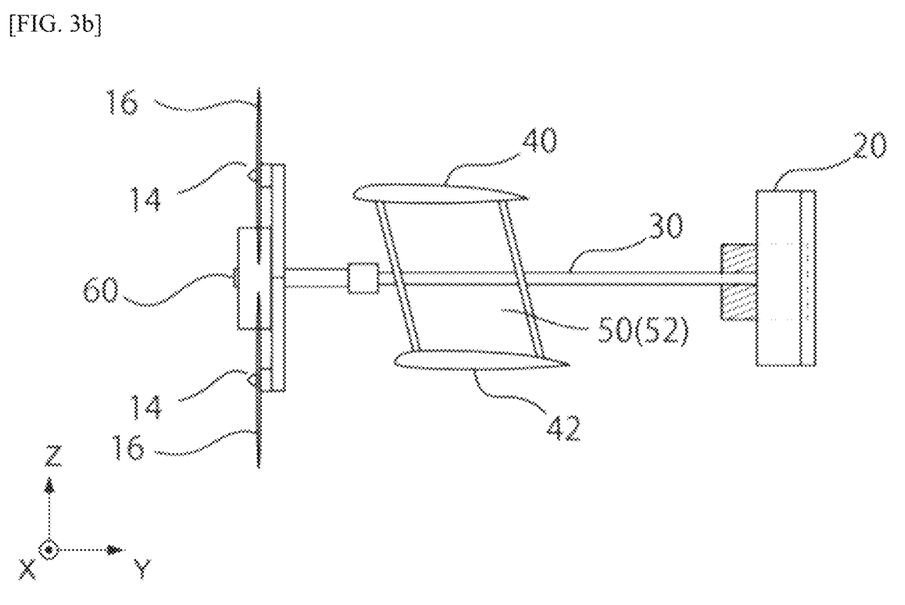

The first position in the present embodiment is a position at least partially overlapping with the fixed wing part 40 in the traveling direction (Y direction). Thereby, the center of thrust and the center of gravity of the mounted object 52 can be brought close to each other, and the flight is stabilized.

Regarding the place of the first position, it can change suitably according to the weight, shape and material etc. of the object to be mounted.

Each of the fixed wing parts (the upper fixed wing 40 and the lower fixed wing 42) are connected to the arm part 30. The flying body according to the present embodiment is a concept in which a biplane is connected to a rotorcraft via a gimbal, but it may not be a biplane.

Next, a flying method of the flying vehicle according to the present embodiment will be described with reference to FIGS. 4 to 10.

Figure 4:
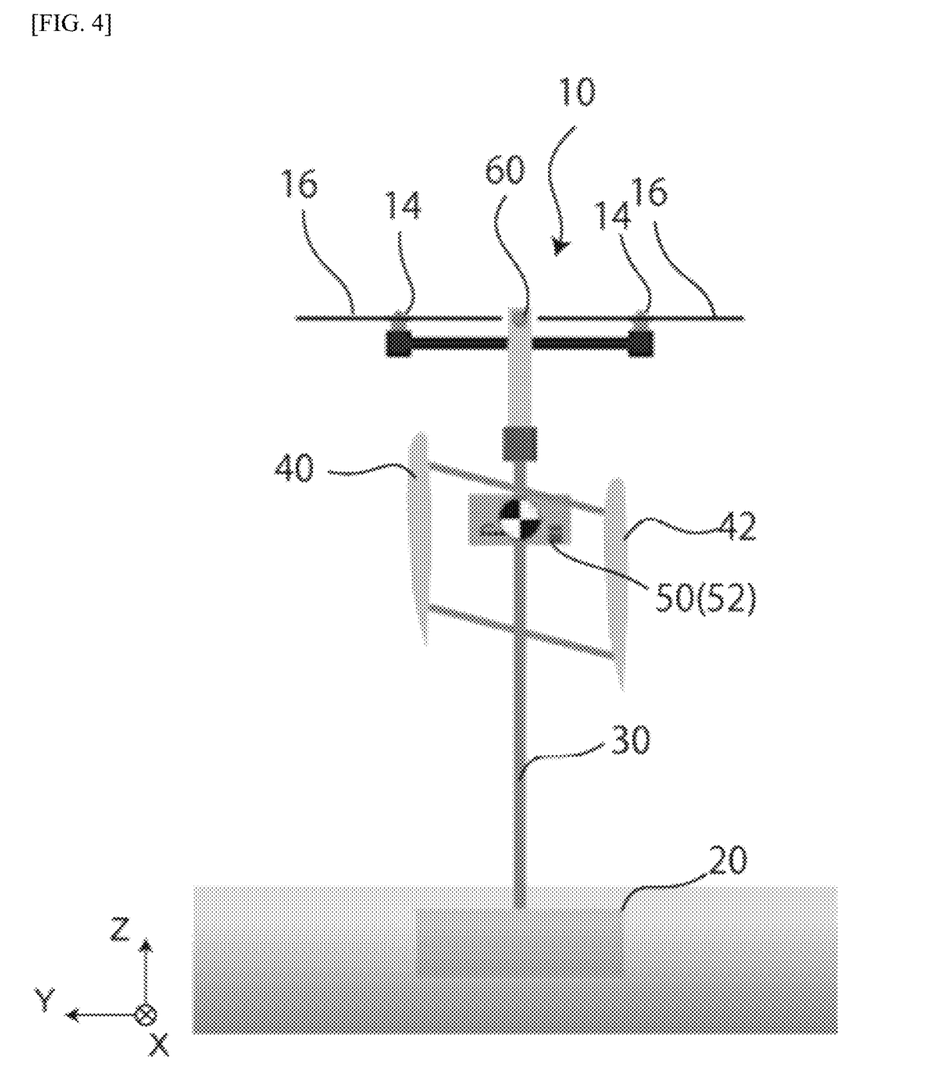
FIG. 4 is a view illustrating an initial state of the flying vehicle of FIG. 1.

FIG. 4 is a diagram illustrating an initial state of the flying vehicle. The mounted object 52 is mounted on the mounting part 50. The mounting part 50 is located at the first position. The center of gravity mark in the figure represents the center of gravity (COG) of the flying vehicle.

In the initial state, the flying vehicle stands upright with the legs 20 in contact with the ground. In other words, in the initial state, the flying vehicle is set so that the arm part 30 stands in the vertical direction.

In the initial state, an auxiliary arm, an auxiliary leg, or the likes, may be used to prevent the flying vehicle from falling.

Figure 5:
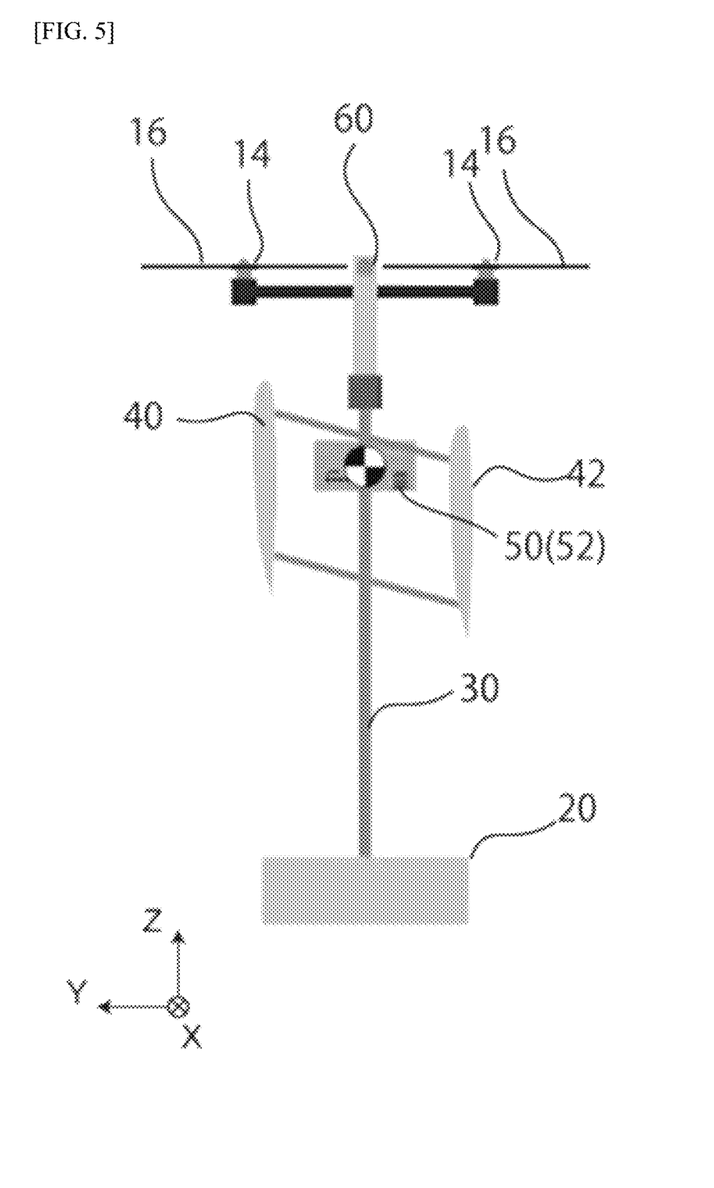
FIG. 5 is a view illustrating a state at the time of ascent of the flying vehicle of FIG. 1.

From the state shown in FIG. 4, the flying vehicle gains an upward thrust by rotating the propeller 16 of the flying part 10, and ascends and rises (ascending posture) as shown in FIG. 5.

Figure 6:
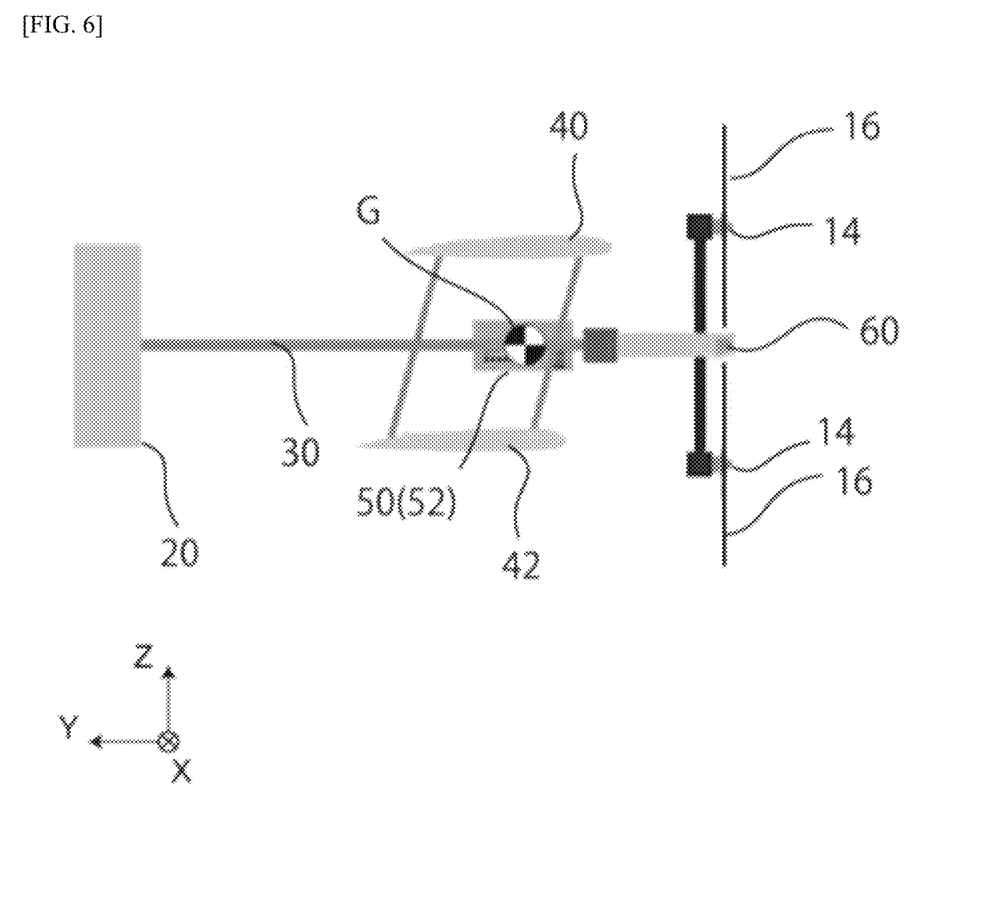
FIG. 6 is a view illustrating a state at the time of flight of the flying vehicle of FIG. 1.

As shown in FIG. 6, when the flying vehicle ascends to a predetermined height, the flying part 10 is displaced toward the horizontal direction by approximately 90 degrees to change the orientation of the flying vehicle (horizontal posture).

In this state, it is possible to propel in the horizontal direction with a similar principle as a propeller airplane. According to this configuration, it is possible to move to above the destination at a high speed.

Figure 7:
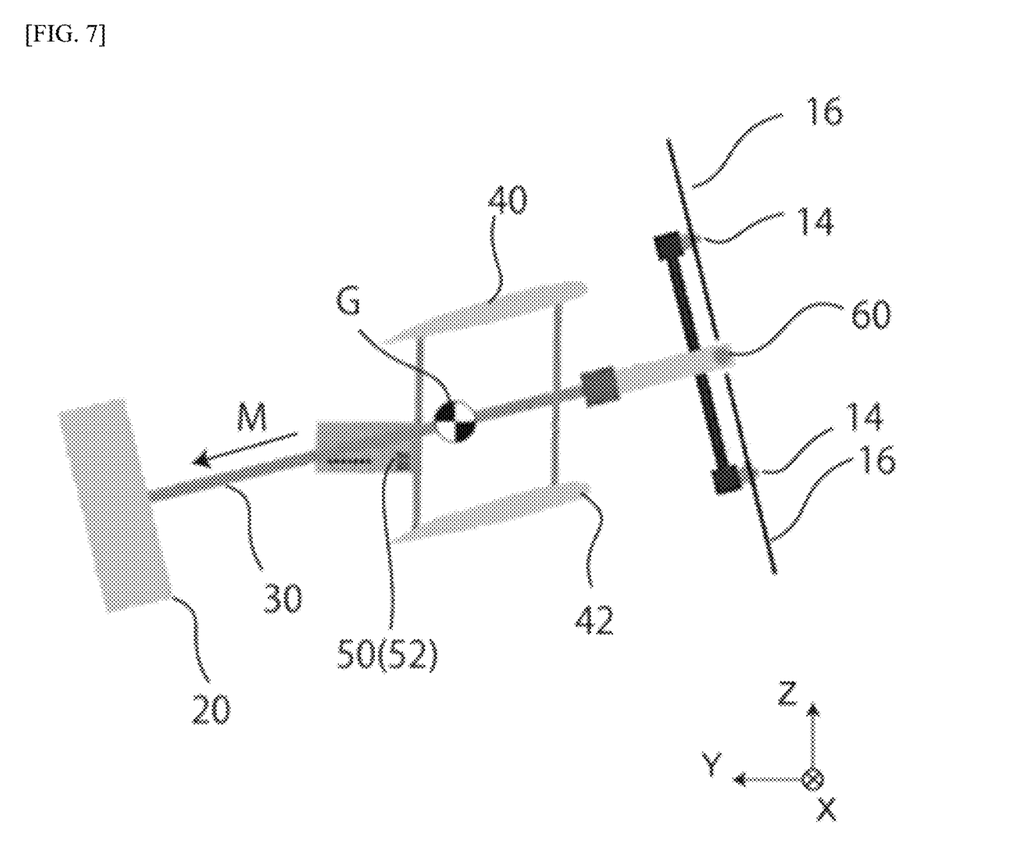
FIG. 7 is a view illustrating a state above a destination of the flying vehicle of FIG. 1.
Figure 8:
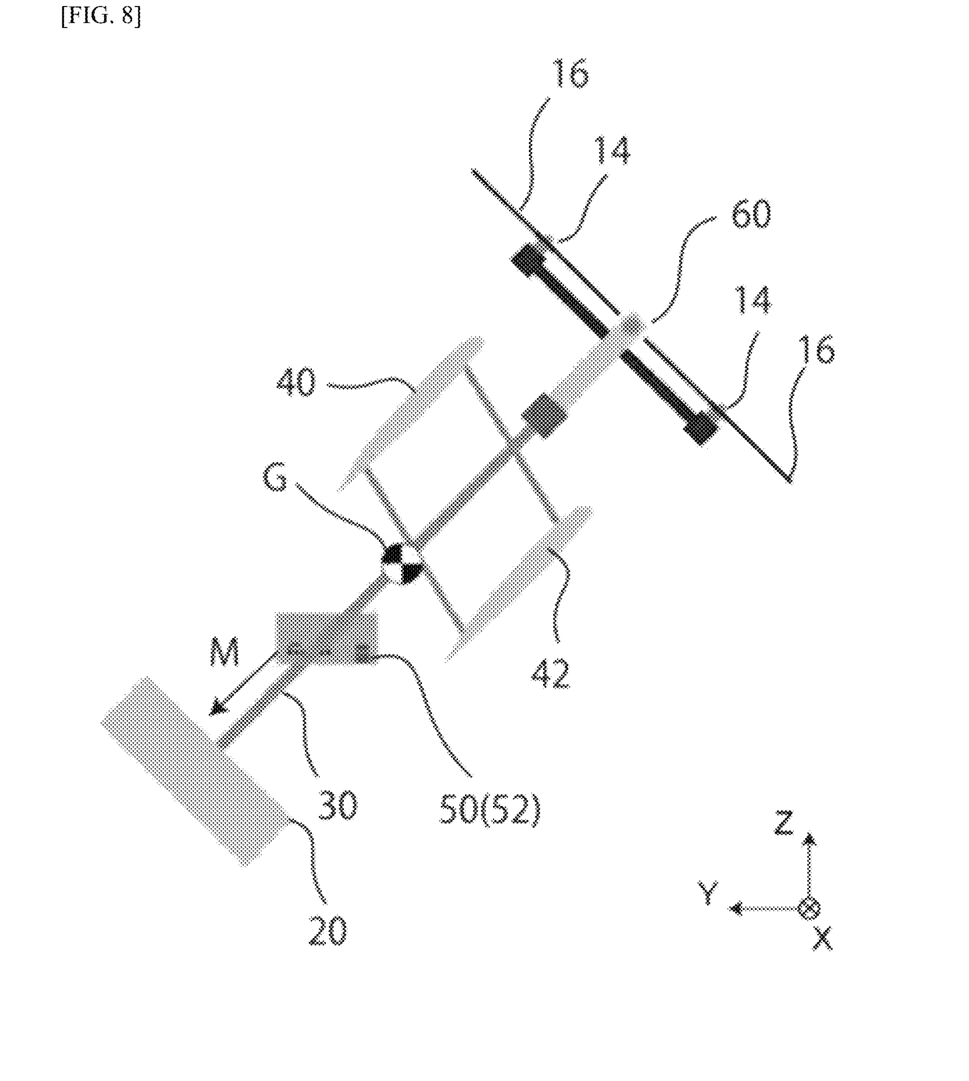
FIG. 8 is another view illustrating a state above a destination sky of the flying vehicle of FIG. 1.

As shown in FIGS. 7 and 8, when the flying vehicle arrives above the destination, the flying vehicle lowers the rotational speed of the propeller 16, sets its body to be vertical (descending posture), and transitions to a hovering state. That is, the orientation of the flying body is returned from the horizontal direction to the vertical direction. At this time, the mounting part 50 that was in the first position moves to the second position, and the mounted object 52 moves accordingly (see arrow M in the figures). As the mounted object moves, the center of gravity G also shifts to the leg side.

Figure 9:
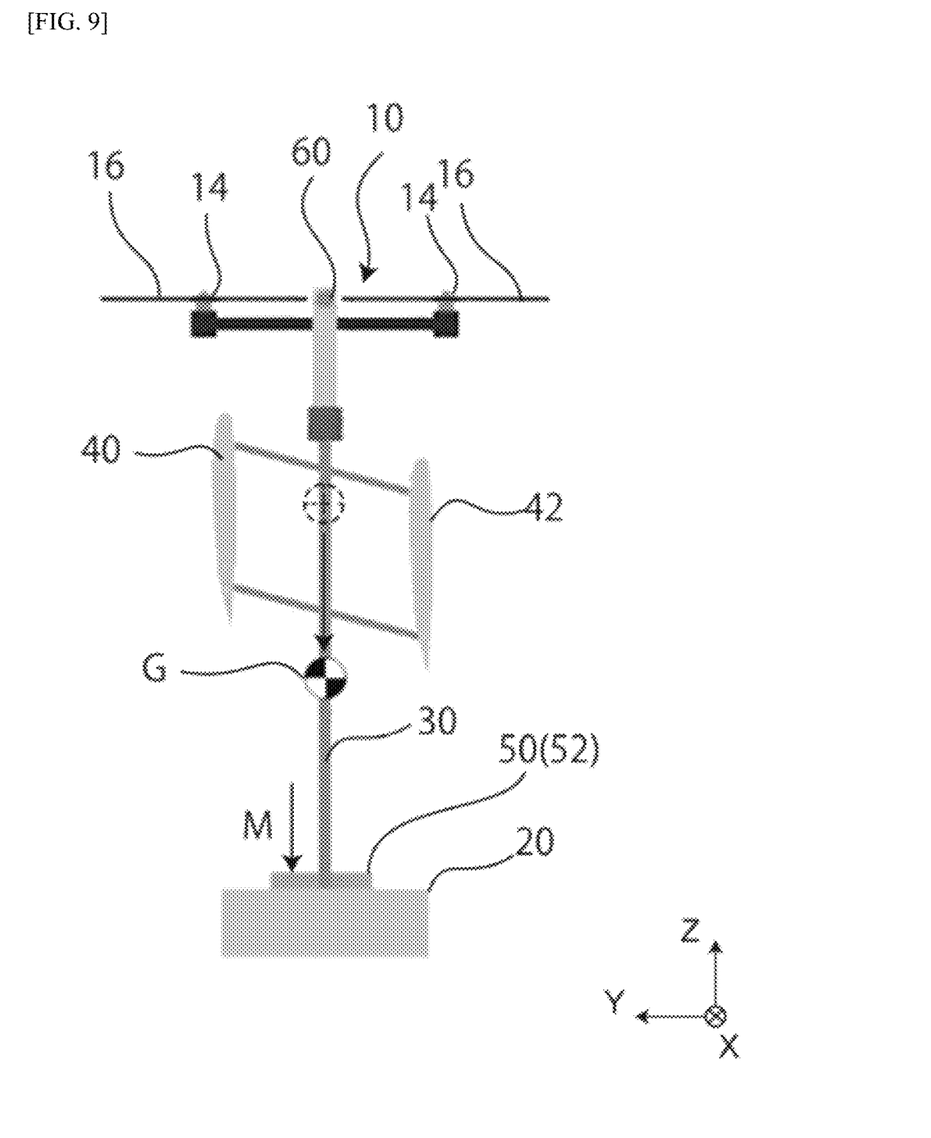
FIG. 9 is a view illustrating a state at the time of descent of the flying body of FIG. 1.

FIG. 9 is a diagram illustrating a state where the vehicle descends from above the destination to the destination. The mounted object 52 has been moved to the second position, and the center of gravity G has also moved from the initial position.

If the mounted object 52 is moved to the second position in the horizontal posture, depending on the weight of the mount object 52, the entire arm part 30 swings like a pendulum when shifting to the descending posture. Therefore, the mounted object 52 is preferably transferred after the flying vehicle starts entering the descending posture, and more safely, it is preferable to enter the state where it is completely in the descending posture.

Figure 10:
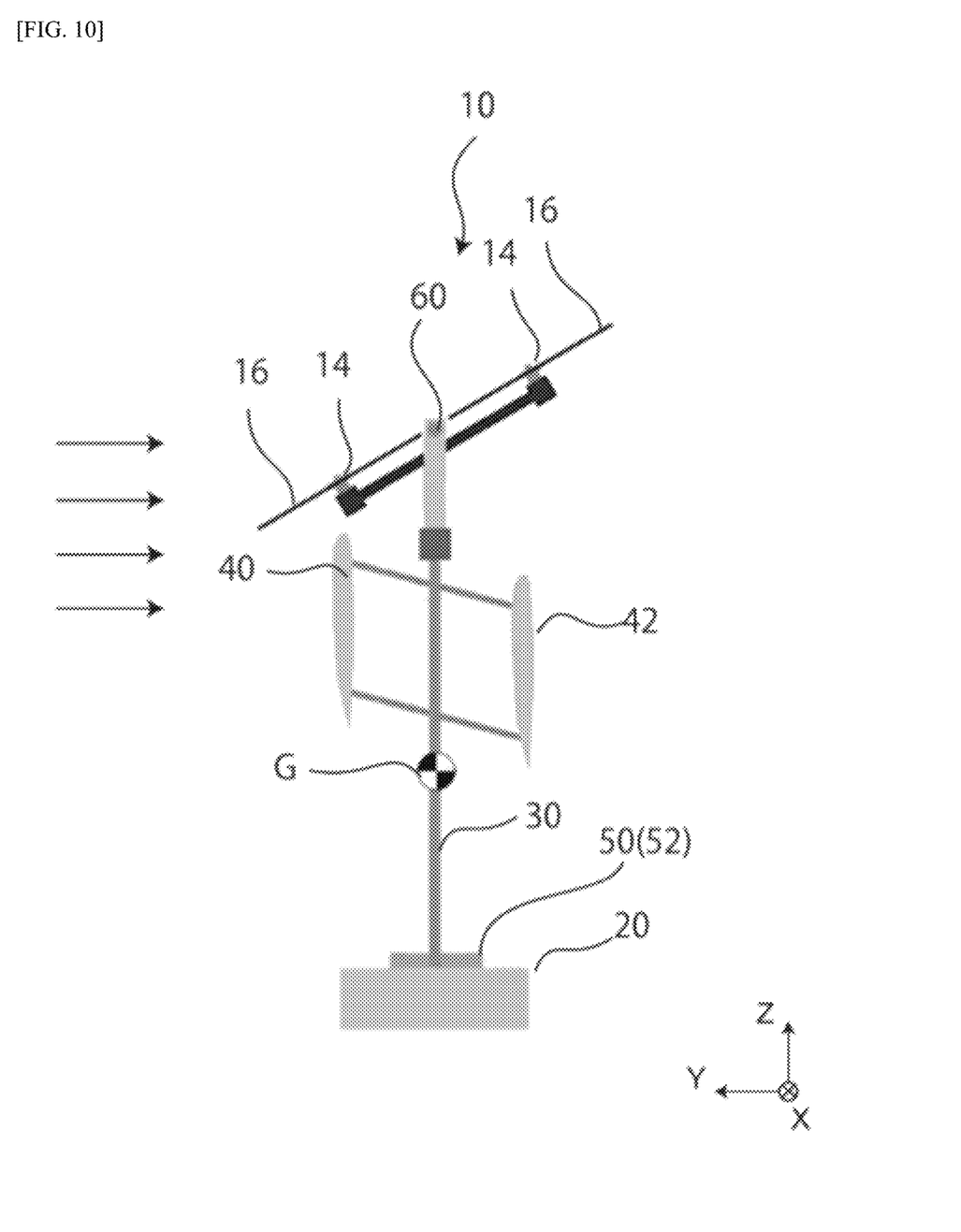
FIG. 10 is another view illustrating a state at the time of descent of the flying body of FIG. 1.

In the present embodiment, as shown in FIG. 10, even when a crosswind or the like blows when descending, the flying part is displaced freely by the gimbal 60, so that it does not flow sideways.

Figure 11:
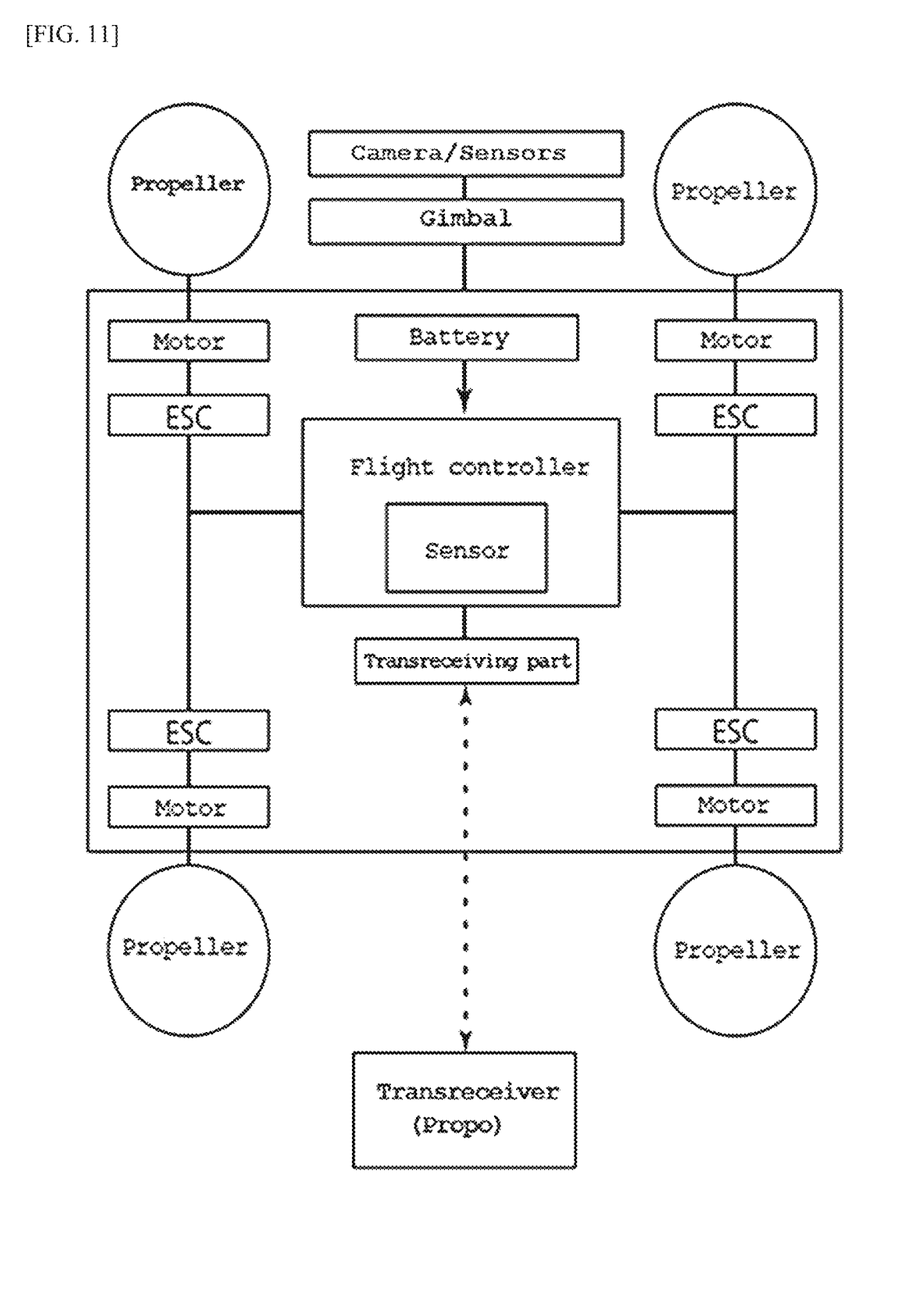
FIG. 11 is a diagram showing functional blocks of the flying part of the flying body of FIG.

The above-described rotorcraft has, for example, a functional block as shown in FIG. 11. Further, the functional block of FIG. 11 is a minimum reference structure. A flight controller is a so-called processing unit. The processing unit may have one or more processors, such as a programmable processor (e.g., a central processing unit (CPU)).

The processing unit has a memory that is not shown and it is possible to access the memory. The memory stores logic, codes, and/or program instructions that can be executed by the processing unit to perform one or more steps.

The memory may include, for example, a separable medium such as an SD card or random access memory (RAM) or an external storage device. Data obtained from cameras and sensors may be transmitted directly to the memory and stored. For example, still image·dynamic image data taken by a camera or the like is recorded in a built-in memory or an external memory.

The processing unit includes a control module configured to control the state of the rotorcraft. For example, the control module may control a propulsion mechanism (such as a motor) in order to adjust the spatial arrangement, velocity, and/or acceleration of the rotorcraft having six degrees of freedom (translational motions x, y, and z, and rotational motions θx, θy, and θz). The control module can control one or more of the states of a mounting part and sensors.

The processing unit can communicate with a transreceiving part configured to send and/or receive data from one or more external devices (e.g., a terminal, display device, or other remote controller). The transreceiver can use any suitable communication means such as wired or wireless communication.

For example, the tranresceiving part can use one or more of a local area network (LAN), a wide area network (WAN), infrared, wireless, WiFi, point-to-point (P2P) network, telecommunication network, cloud communication, and the like.

The transreceiving part can transmit and/or receive one or more of, data acquired by sensors, process results generated by the processing unit, predetermined control data, user command from a terminal or a remote controller, and the like.

Sensors according to the present embodiment may include inertial sensors (acceleration sensors, gyro sensors), GPS sensors, proximity sensors (e.g., LiDAR), or vision/image sensors (e.g., cameras).

The rotorcraft of the present disclosure can be expected to be used as a rotorcraft for exclusively for home delivery service in medium to long distances, and an industrial rotary wing machine in a wide area monitoring operation and a reconnaissance and rescue operation in a mountain area. In addition, the rotorcraft of the present disclosure can be used in airplane-related industries such as multicopters and drones. Furthermore, the present disclosure can be suitably used as an aircraft equipped with a camera or the like and capable of performing aerial photography missions, and also can be used in various industries such as security field, agriculture, infrastructure monitoring.

The embodiment described above is merely an example to facilitate the understanding of the present disclosure and are not intended to limit the present disclosure. The present disclosure can be modified and improved without departing from the gist thereof, and as a matter of course, the present disclosure includes the equivalents thereof.

DESCRIPTION OF REFERENCE NUMERALS

1 flying vehicle
10 flying part 12 motor arm
14 motor
16 propeller
20 leg part
30 arm part
40 upper fixed wing
42 lower fixed wing
50 mounting part
52 mounted object/object to be mounted
60 gimbal

The invention claimed is:

1. A flying vehicle, comprising:
a flying part having a plurality of rotary blades for generating thrust;
a leg part;
an arm part connecting the flying part and the leg part; and
a fixed wing part provided at substantially the center of the arm part,
wherein the arm part is a plurality of long members formed along a front-back direction of the fixed wing part,
wherein the leg part has a plate structure extending along the front-back direction and connected to the plurality of long members,
wherein the leg part is located at a rear end of the flying vehicle,
wherein the flying vehicle further comprises a mounting part installed to be movable between a first position of the arm part and a second position located behind the first position.

2. The flying vehicle of claim 1,
wherein the first position at least overlaps with the fixed wing part in a front-rear direction.

3. The flying vehicle of claim 1,
wherein the fixed wing part is configured to have a pair of two fixed wings, and
the first position is located between the pair of the fixed wings.

4. The flying vehicle of claim 3,
wherein the second position at least overlaps with the fixed wing part in a front-rear direction.

5. The flying vehicle of claim 4,
further comprising a connecting part for connecting the flying part and the arm part so as to be displaceable independently of each other.

6. The flying vehicle of claim 3,
further comprising a connecting part for connecting the flying part and the arm part so as to be displaceable independently of each other.

7. The flying vehicle of claim 2,
wherein the fixed wing part is configured to have a pair of two fixed wings, and
the first position is located between the pair of the fixed wings.

8. The flying vehicle of claim 7,
wherein the second position at least overlaps with the fixed wing part in a front-rear direction.

9. The flying vehicle of claim 8,
further comprising a connecting part for connecting the flying part and the arm part so as to be displaceable independently of each other.

10. The flying vehicle of claim 7,
further comprising a connecting part for connecting the flying part and the arm part so as to be displaceable independently of each other.

11. The flying vehicle of claim 1,
wherein the second position at least overlaps with the fixed wing part in a front-rear direction.

12. The flying vehicle of claim 11,
further comprising a connecting part for connecting the flying part and the arm part so as to be displaceable independently of each other.

13. The flying vehicle of claim 2,
wherein the second position at least overlaps with the fixed wing part in a front-rear direction.

14. The flying vehicle of claim 13,
further comprising a connecting part for connecting the flying part and the arm part so as to be displaceable independently of each other.

15. The flying vehicle of claim 1,
further comprising a connecting part for connecting the flying part and the arm part so as to be displaceable independently of each other.

16. The flying vehicle of claim 15,
wherein the connecting part connecting the flying part and the arm part is a gimbal.

17. The flying vehicle of claim 2,
further comprising a connecting part for connecting the flying part and the arm part so as to be displaceable independently of each other.

18. The flying vehicle of claim 1,
wherein each of the plurality of long members has a first end and a second end and extends longitudinally from the first end to the second end in the front-back direction, the first end is connected to the flying part, and the second end is connected to the leg part, and
wherein the leg part surrounds the plurality of long members.

19. A flying method of the flying vehicle of claim 1, comprising:
a step of, in an initial state, setting the mounting part at the first position and mounting an object to be mounted, and of setting the arm part to stand vertically so that the flying part is at an upper end;
a step of driving the flying part to ascend the flying part to be the front end in a traveling direction;
a step of, at a predetermined height, flying the flying part by displacing the flying part toward the horizontal direction by approximately 90 degrees so that the arm part extends in the horizontal direction;
a step of, above a destination, setting the arm part to stand vertically so that the leg part is at a lower end, and displacing the mounting part from the first position to the second position; and
a step of descending so that the leg part is at the lower end.

20. The flying method of claim 19,
wherein, in the initial state, the leg part is set to contact ground.

* * * * *